(12) United States Patent
Zhang et al.

(10) Patent No.: US 11,734,152 B2
(45) Date of Patent: Aug. 22, 2023

(54) METHOD AND SYSTEM FOR DETECTING GPU-RELATED FACTORS OF MULTI-MODE DISTRIBUTED CLUSTER

(71) Applicant: Nanjing University of Posts and Telecommunications, Nanjing (CN)

(72) Inventors: Dengyin Zhang, Nanjing (CN); Junjiang Li, Nanjing (CN); Yi Cheng, Nanjing (CN); Yingjie Kou, Nanjing (CN); Zheng Zhou, Nanjing (CN); Wensheng Han, Nanjing (CN); Shibo Kang, Nanjing (CN)

(73) Assignee: Nanjing University of Posts and Telecommunications, Nanjing (CN)

( * ) Notice: Subject to any disclaimer, the term of this patent is extended or adjusted under 35 U.S.C. 154(b) by 83 days.

(21) Appl. No.: 17/369,909

(22) Filed: Jul. 7, 2021

(65) Prior Publication Data
US 2021/0382808 A1 Dec. 9, 2021

Related U.S. Application Data

(63) Continuation-in-part of application No. PCT/CN2020/110992, filed on Aug. 25, 2020.

(30) Foreign Application Priority Data

Jun. 5, 2020 (CN) .......................... 202010506445.2

(51) Int. Cl.
*G06F 11/00* (2006.01)
*G06F 11/34* (2006.01)
(Continued)

(52) U.S. Cl.
CPC ...... *G06F 11/3495* (2013.01); *G06F 11/0709* (2013.01); *G06F 11/079* (2013.01);
(Continued)

(58) Field of Classification Search
None
See application file for complete search history.

(56) References Cited

U.S. PATENT DOCUMENTS 10,884,762 B1* 1/2021 Truong ................ G06F 11/1469
2017/0177458 A1* 6/2017 Viggers ................ G06F 11/263
(Continued)

OTHER PUBLICATIONS

Google Scholar/Patents search—text refined (Year: 2022).*
Google Scholar/Patents search—text refined (Year: 2023).*

*Primary Examiner* — Christopher S McCarthy (57) ABSTRACT

A method for detecting comprehensive GPU-related factors of a distributed cluster, the method including: (1): checking whether there is a configuration file content of an operating node; (2): reading a mode parameter in an environment variable of the operating node, and correspondingly switching an operating mode according to the mode parameter; (3): reading a timer frequency value from the environment variable of the operating node so as to set a time period for reading a GPU information parameter according to the timer frequency value; (4): calculating the maximum value of the GPU information parameter of the operating node, and storing the maximum value into the GPU information list cache; and (5): initializing the transmitted information; determining whether there is a GPU in the GPU information list cache of the operating node.

10 Claims, 3 Drawing Sheets

(51) Int. Cl.
*G06F 11/07* (2006.01)
*G06F 11/30* (2006.01)

(52) U.S. Cl.
CPC ...... *G06F 11/0724* (2013.01); *G06F 11/0772* (2013.01); *G06F 11/3006* (2013.01); *G06F 11/3024* (2013.01); *G06F 11/3476* (2013.01)

(56) References Cited

U.S. PATENT DOCUMENTS

| | | | |
|---|---|---|---|
| 2017/0221174 A1* | 8/2017 | Khac | G09G 5/363 |
| 2021/0027415 A1* | 1/2021 | Khalid | H04L 67/1008 |
| 2022/0342738 A1* | 10/2022 | Samuel | G06N 20/00 |

* cited by examiner

METHOD AND SYSTEM FOR DETECTING GPU-RELATED FACTORS OF MULTI-MODE DISTRIBUTED CLUSTER

CROSS-REFERENCE TO RELAYED APPLICATIONS

This application is a continuation-in-part of International Patent Application No. PCT/CN2020/110992 with an international filing date of Aug. 25, 2020, designating the United States, now pending, and further claims foreign priority benefits to Chinese Patent Application No. 202010506445.2 filed Jun. 5, 2020. The contents of all of the aforementioned applications, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, Mass. 02142.

BACKGROUND

The disclosure relates to the technical field of cloud computing, and more particularly to a method and system for detecting comprehensive GPU-related factors of a distributed cluster.

In the cloud computing field, the application of a graphics processing unit (GPU) is possible to quicken the training speed of the machine learning algorithms, and the training tasks and workflows that use the GPU are gradually diversified. These training tasks and workflows have different requirements for aspects of the GPU. However, at present, majority of distributed clusters are insufficient in the detection of GPU performance, and are able to simply detect the number of GPUs but neglect the detection of fine-grained GPU performance. As a result, this coarse-grained detecting mechanism can schedule GPU task to a sub-optimal node, which fails to adapt to complex scenarios and further results in performance degradation.

The frequency of using a GPU in a cloud computing service is on the rise, so tasks using the GPU will emerge constantly, thereby bringing a great challenge to the GPU resource scheduling. The rationality of the GPU resource scheduling is related to the period of GPU detection. Thus, the distributed cluster needs to detect the status of the GPU periodically, otherwise the allocation of tasks in the whole distributed cluster will be unbalanced, thereby affecting the result of GPU resource scheduling and indirectly resulting in low resource utilization of the distributed cluster.

SUMMARY

One objective of the disclosure is to provide a method and system for detecting comprehensive GPU-related factors of a distributed cluster, which are able to reduce the frequency of information reporting, lower the cost for information transmission and adapt to the GPU computing requirements of more complex scenarios.

To achieve the above objective, the disclosure provides a method for detecting comprehensive GPU-related factors of a distributed cluster, the method being applied to a GPU sniffer and comprising the following steps:

(1): checking whether there is a configuration file content of an operating node; if there is the configuration file content of the operating node, reading the configuration file content of the operating node, storing the configuration file content into a GPU information list cache, determining whether the communication with a data plane is normal, if normal, executing (2); if the communication is failed, recording the cause of failure and transmitting failure information to an engineer, and communicating with the data plane again by the GPU sniffer until the communication is normal; and, if there is no configuration file content of the operating node, recording the cause of failure and transmitting the failure information to the engineer, and ending this step;

(2): reading a mode parameter in an environment variable of the operating node, and correspondingly switching an operating mode according to the mode parameter;

(3): reading a timer frequency value from the environment variable of the operating node so as to set a time period for reading a GPU information parameter according to the timer frequency value; reading the number of GPUs and a GPU information parameter of the operating node, and storing the number of GPUs and the GPU information parameter of the operating node into the GPU information list cache; if there is no GPU in the GPU information list cache, emptying the GPU information list cache; if the health status of a GPU is UNHEALTH, not adding the GPU information parameter to the GPU information list cache; after (5) is executed, resetting a timer, waiting for a next time period for reading the GPU information parameter, and executing the (3) again; and, if the operating node is concurrent asynchronously, executing (4);

(4): calculating the maximum value of the GPU information parameter of the operating node, and storing the maximum value into the GPU information list cache; if the GPU information list cache of the operating node is empty, directly executing the (5); and, calculating a GPU performance score of the operating node in a different operating mode according to the value of the GPU information parameter and the maximum value of the GPU information parameter, and setting a GPU having the highest performance score as MainGPU; and (5): initializing the transmitted information; determining whether there is a GPU in the GPU information list cache of the operating node; if there is no GPU in the GPU information list cache of the operating node, packaging information indicating the absence of a GPU, and transmitting the packaged information to the data plane for reporting by loading the configuration file content in the GPU information list cache in the (1); if there is a GPU in the GPU information list cache of the operating node, adding the information parameter of the MainGPU and the corresponding value of the information parameter of the MainGPU to fields of the transmitted information, calculating the number of GPUs and the total size of GPU memory, adding the number of GPUs and the total size of GPU memory to fields of the transmitted information, transmitting the transmitted information to the data plane for reporting so that the transmitted information is received and checked by a checker and stored into the GPU information list cache; and during next information reporting, comparing each field of the transmitted information in the GPU information list cache with each field of the newly-generated transmitted information; if each field of the transmitted information in the GPU information list cache is identical to each field of the newly-generated transmitted information, not reporting information, or otherwise covering the transmitted information in the GPU information list cache by using the newly-generated transmitted information, loading the configuration file content in the GPU information list cache in (1), and transmitting the newly-generated transmitted information to the data plane for reporting so that the newly-generated transmitted information is received and checked by the checker.

In a class of this embodiment, the configuration file content of the operating node in (1) comprises the IP address and port number of the data plane.

In a class of this embodiment, the GPU information parameter comprises the identification number of a GPU, the health status of the GPU, the model of the GPU, the operating power of the GPU, the frequency of GPU memory, the size of GPU memory, the size of residual GPU memory, the number of GPU cores and the GPU bandwidth.

In a class of this embodiment, in (3), the reading a timer frequency value from the environment variable of the operating node comprises:

if the read timer frequency value is null, defaulting the time period of the GPU information parameter as 1 s, and reading the GPU information parameter of the operating node every 1 s; if the read timer frequency value is greater than 10, setting the timer frequency value as 10; if the read timer frequency value is less than 0.1, setting the timer frequent value as 0.1; and, if the read timer frequency value is in a valid range, not resetting the timer frequency value, where the valid range of the timer frequency is 0.1 to 10.

In a class of this embodiment, in (4), the GPU performance score of the operating node in a different operating mode is calculated by the following formula:

$$Score = \left(\frac{GMemoryClock}{MaxMemClock}\right) \times 100 + MemCWeight +$$
$$\left(\frac{GCores}{MaxCores}\right) \times 100 \times CoreWeight +$$
$$\left(\frac{GBandwidth}{MaxBandwidth}\right) \times 100 \times BandWeight +$$
$$\left(1 - \frac{GPower}{MaxPower}\right) \times 100 \times PowWeight +$$
$$\left(\frac{GMemory}{MaxMemory} + \frac{GFreeMemory}{MaxFreeMem} \times FreeMemWeight\right) \times$$
$$100 \times MemoryWeight$$

where Score is the GPU performance score of the operating node in a different operating mode; MemCWeight is the weight of the frequency of the GPU memory; Core-Weight is the weight of the number of the GPU cores; BandWeight is the weight of the GPU bandwidth; Pow-Weight is the weight of the operating power of the GPU; FreeMemWeight is the weight of the residual GPU memory; MemoryWeight is the weight of the total GPU memory; GMemoryClock is the size of GPU memory; GCores is the number of GPU cores; GBandwidth is the GPU bandwidth; GPower is the operating power of the GPU; GMemory is the size of total GPU memory; GFreeMemory is the size of residual GPU memory; MaxMemClock is the maximum value of the frequency of GPU memory; MaxCores is the maximum value of the number of GPU cores; MaxBandwidth is the maximum value of the GPU bandwidth; Max-Power is the maximum value of the operating power of the GPU; MaxMemory is the maximum value of the size of total GPU memory and, MaxFreeMem is the maximum value of the size of residual GPU memory.

The disclosure also provides a method for detecting comprehensive GPU-related factors of a distributed cluster, the method being applied to a checker and comprising the following steps:

waiting to start a memory and connect a shared memory; if the connection is failed, writing, by a data node, a connection log locally for use by an engineer to check errors, and ending this step; and, if the connection is successful, starting a checker by the data node;

checking whether there is a configuration file content of the data node; and, if there is no configuration file content of the data node, recording the cause of failure and transmitting failure information to the engineer, and ending this step;

if there is the configuration file content of the data node, reading the configuration file content of the data node and storing the configuration file content into a GPU information list cache of an operating node so that a Web server is started to block monitoring, and waiting to receive and check report information transmitted by a GPU sniffer; if the check is failed, discarding the report information, and writing the report time and error into a data plane log; and, if the check is successful, transmitting the report information to the memory so that the memory compares the report information with a database of the data plane;

if the result of comparison indicates that the report information is inconsistent with that stored in the data plane, immediately storing the report information by the memory, or otherwise determining whether each field in the report information is consistent with each field in corresponding data of the database;

if each field in the report information is consistent with each field in corresponding data of the database, performing no processing by the memory; and, if each field in the report information is not consistent with each field in corresponding data of the database, updating, by the memory, each field in corresponding data of the database as each field in the report information, and writing the updated result into the data plane log; and re-waiting to receive and check report information transmitted by the GPU sniffer.

In a class of this embodiment, the configuration file content of the data node comprises the IP address and port number of the data node; and the report information comprises information indicating whether the report node exists in the distributed cluster, information indicating whether it has a permission to report information, information indicating whether the format of the report information is standard, and information indicating whether fields in the report information are legal.

In a class of this embodiment, the operating node comprises a GPU sniffer, the data plane comprises no less than three data nodes, and the data node comprises a memory and a checker.

The disclosure discloses a system for detecting comprehensive GPU-related factors of a distributed cluster, the system comprising:

a configuration file content checking module configured to: check whether there is a configuration file content of an operating node; if there is the configuration file content of the operating node, read the configuration file content of the operating node, store the configuration file content into a GPU information list cache, determine whether the communication with a data plane is normal, if normal, execute a "mode switching module"; if the communication is failed, record the cause of failure and transmit failure information to an engineer, and communicate with the data plane again by the GPU sniffer until the communication is normal; and, if there is no configuration file content of the operating node, record the cause of failure and transmit it to the local, transmit the failure information to the engineer, and end this step;

a mode switching module configured to: read a mode parameter in an environment variable of the operating node, and correspondingly switch an operating mode according to the mode parameter;

a reading module configured to: read a timer frequency value from the environment variable of the operating node so as to set a time period for reading a GPU information parameter according to the timer frequency value; and, read the number of GPUs and a GPU information parameter of the operating node, and store the number of GPUs and the GPU information parameter of the operating node into the GPU information list cache;

a score calculation module configured to: calculate the maximum value of the GPU information parameter of the operating node, and store the maximum value of the GPU information parameter of the operating node into the GPU information list cache; and, calculate a GPU performance score of the operating node in a different operating mode according to the value of the GPU information parameter and the maximum value of the GPU information parameter, and set a GPU having the highest performance score as MainGPU; and an information reporting module configured to: initialize the transmitted information, determine whether there is a GPU in the GPU information list cache, and report information.

The disclosure discloses a system for detecting comprehensive GPU-related factors of a distributed cluster, the system comprising:

a connection waiting module configured to: wait to start a memory and connect a shared memory; if the connection is failed, writing, by a data node, a connection log locally for use by an engineer to check errors, and end this step; and, if the connection is successful, start a checker by the data node;

a configuration file content checking module configured to: check whether there is a configuration file content of the data node; if there is no configuration file content of the data node, record the cause of failure and transmit it to the local, transmit failure information to the engineer, and end this step; if there is the configuration file content of the data node, read the configuration file content of the data node and store the configuration file content into a GPU information list cache of an operating node so that a Web server is started to block monitoring, and wait to receive and check report information transmitted by a GPU sniffer; if the check is failed, discard the report information, and write the report time and error into a data plane log; and, if the check is successful, transmit the report information to the memory;

a data comparison module configured to: compare, by the memory, the report information with a database of the data plane; if the result of comparison indicates that the report information is inconsistent with that stored in the data plane, immediately store the report information by the memory, or otherwise determine whether each field in the report information is consistent with each field in corresponding data of the database; if each field in the report information is consistent with each field in corresponding data of the database, performing no processing by the memory; and, if each field in the report information is not consistent with each field in corresponding data of the database, execute an "updating and writing module";

an updating and writing module configured to: update, by the memory, each field in corresponding data of the database as each field in the report information, and write the updated result into the data plane log; and a reporting re-writing module configured to: re-wait to receive and check report information transmitted by the GPU sniffer.

In accordance with the disclosure, GPU information is updated by comparing the GPU information stored in list cache of the operating node with the that in the data plane, so that the frequency of information reporting is reduced and the cost for information transmission is lowered. The diversity of GPU resources is highlighted by a multi-mode scoring strategy, so that GPU computing requirements of more complex scenarios are adapted.

DETAILED DESCRIPTION

An objective of the disclosure is to provide a method and system for detecting comprehensive GPU-related factors of a distributed cluster, which are able to reduce the frequency of information reporting, lower the cost for information transmission and adapt to more complex scenarios.

To make the objectives, features and advantages of the disclosure more obvious and comprehensible, the disclosure will be further described below in detail by specific implementations with reference to the accompanying drawings.

Figure 1:
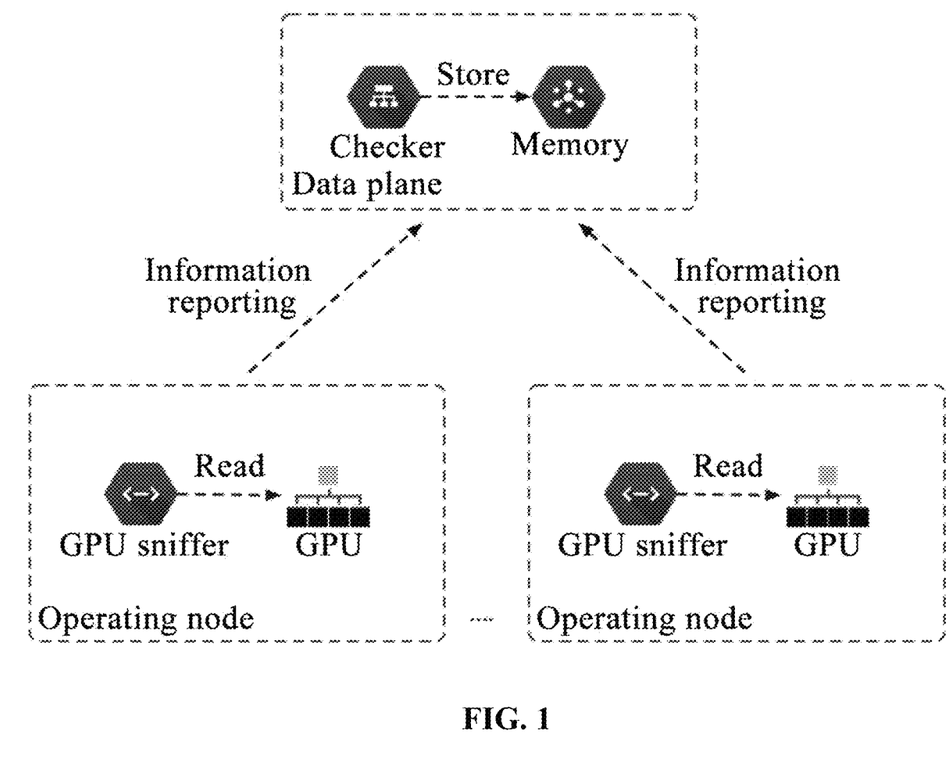
FIG. 1 is an internal architecture diagram of operating nodes and a data plane in a method for detecting comprehensive GPU-related factors of a distributed cluster according to an embodiment of the disclosure.

As shown in FIG. 1, the scale of the cluster is varied according to the actual production, but there is at least more than one operating node. There is a GPU sniffer and a GPU in each operating node. A data plane comprises no less than three data nodes, and each data node comprises a memory and a checker.

Figure 2:
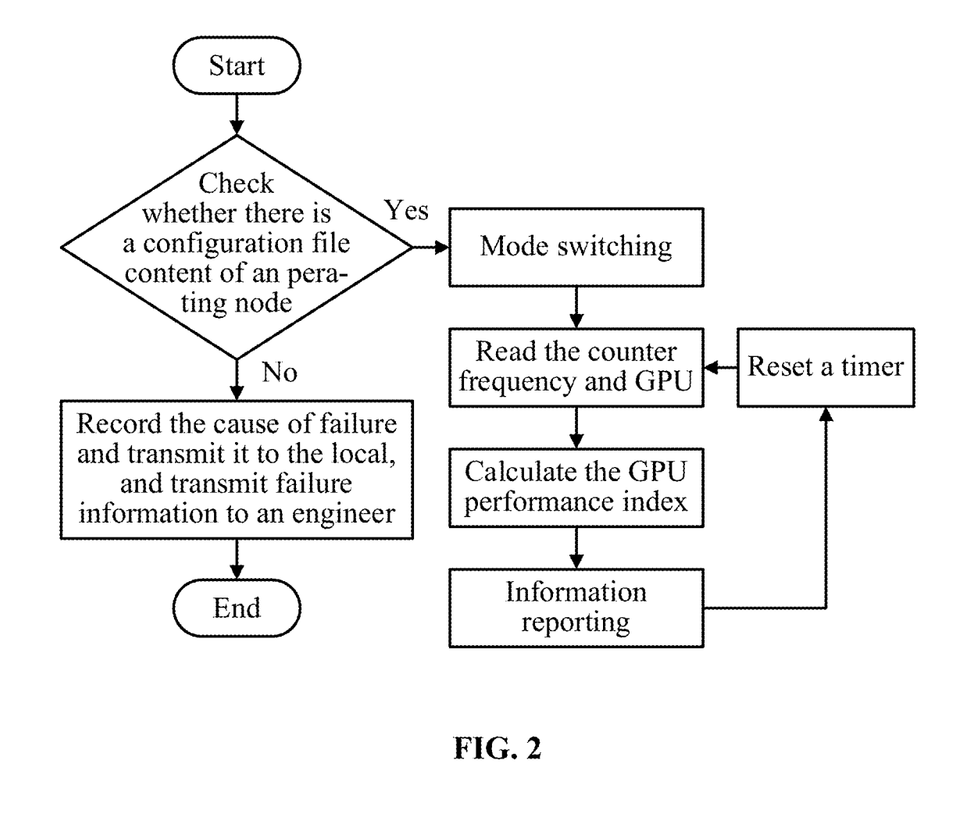
FIG. 2 is a flowchart of the operation of a GPU sniffer in method for detecting comprehensive GPU-related factors of a distributed cluster according to an embodiment of the disclosure.

As shown in FIG. 2, the disclosure provides a method for detecting comprehensive GPU-related factors of a distributed cluster, comprising the following steps.

(1): A GPU sniffer checks whether there is a configuration file content of an operating node. If there is the configuration file content of the operating node, the configuration file content of the operating node is read, and the configuration file content is stored into a GPU information list cache for communication with a data plane. If the communication is normal, (2) will be executed; and, if the communication is failed, the cause of failure is recorded and transmitted it to the local, failure information is transmitted to an engineer, and a rated time is waited for communication with the data plane again until the communication is normal. If there is no configuration file content of the operating node, the cause of failure is recorded and transmitted to the local, the failure information is transmitted to the engineer, and this step ends. The configuration file content of the operating node comprises the IP address and port number of the data plane.

(2): The GPU sniffer reads a mode parameter in an environment variable of the operating node, and correspondingly switches an operating mode according to the mode parameter. The mode parameter is used for setting the operating mode of the GPU sniffer during information acquisition. The mode parameter is set as only three types, i.e., resource-first (Full), high performance (High) and low power (LowPower). If the mode parameter is a parameter that is not set or other value, the operating mode is switched to a resource-first mode; if the mode parameter is set as high performance, the operating mode is switched to a high performance model; and, if the mode parameter is set as low power, the operating mode is switched to a low power mode.

(3): The GPU sniffer reads a timer frequency value from the environment variable of the operating node so as to set a time period for reading a GPU information parameter according to the timer frequency value. The number of GPUs and a GPU information parameter of the operating node are read, and the number of GPUs and the GPU information parameter of the operating node are stored into the GPU information list cache. If there is no GPU in the GPU information list cache, the GPU information list cache is emptied. If the health status of a GPU is UNHEALTH, the GPU information parameter is not added to the GPU information list cache. After (5) is executed, a timer is reset, a next time period for reading the GPU information parameter is waited, and (3) will be executed again. If the operating node is concurrent asynchronously, (4) will be executed.

Specifically, the GPU sniffer reading a timer frequency value from the environment variable of the operating node comprises the following steps.

If the read timer frequency value is null, the GPU sniffer defaults the time period of the GPU information parameter as 1 s, and reads the GPU information parameter of the operating node every 1 s. If the read timer frequency value is greater than 10, the timer frequency value is set as 10. If the read timer frequency value is less than 0.1, the timer frequent value is set as 0.1. If the read timer frequency value is in a valid range, the timer frequency value is not reset, where the valid range of the timer frequency is 0.1 to 10, and the unit of the timer frequency is 1/s. The GPU sniffer reads the number of GPUs and the GPU information parameter of the operating node and stores them into the GPU information list cache. The GPU information parameter comprises the identification number of the GPUs, the health status of the GPU, the model of the GPU, the operating power of the GPU, the frequency of the GPU memory, the size of total GPU memory, the size of residual GPU memory, the number of GPU cores and the GPU bandwidth.

(4): The GPU sniffer calculates the maximum value of the GPU information parameter of the operating node and stores the maximum value into the GPU information list cache. If the GPU information list cache of the operating node is empty, (5) will be directly executed. A GPU performance score of the operating node in a different operating mode is calculated according to the value of the GPU information parameter and the maximum value of the GPU information parameter, and a GPU having the highest performance score is set as MainGPU.

In (4), the GPU performance score of the operating node in a different operating mode is calculated by the following formula:

$$Score = \left(\frac{GMemoryClock}{MaxMemClock}\right) \times 100 + MemCWeight +$$
$$\left(\frac{GCores}{MaxCores}\right) \times 100 \times CoreWeight +$$

-continued
$$\left(\frac{GBandwidth}{MaxBandwidth}\right) \times 100 \times BandWeight +$$
$$\left(1 - \frac{GPower}{MaxPower}\right) \times 100 \times PowWeight +$$
$$\left(\frac{GMemory}{MaxMemory} + \frac{GFreeMemory}{MaxFreeMem} \times FreeMemWeight\right) \times$$
$$100 \times MemoryWeight$$

where Score is the GPU performance score of the operating node in a different operating mode; MemCWeight is the weight of the frequency of the GPU memory; CoreWeight is the weight of the number of the GPU cores; BandWeight is the weight of the GPU bandwidth; PowWeight is the weight of the operating power of the GPU; FreeMemWeight is the weight of the residual GPU memory; MemoryWeight is the weight of the total GPU memory; GMemoryClock is the size of GPU memory; GCores is the number of GPU cores; GBandwidth is the GPU bandwidth; GPower is the operating power of the GPU; GMemory is the size of total GPU memory; GFreeMemory is the size of residual GPU memory; MaxMemClock is the maximum value of the frequency of GPU memory; MaxCores is the maximum value of the number of GPU cores; MaxBandwidth is the maximum value of the GPU bandwidth; MaxPower is the maximum value of the operating power of the GPU; MaxMemory is the maximum value of the size of total GPU memory and, MaxFreeMem is the maximum value of the size of residual GPU memory.

The weight of the frequency of GPU memory, the weight of the number of GPU cores, the weight of the GPU bandwidth, the weight of the operating power of the GPU, the weight of the size of residual GPU memory and the weight of the size of total GPU memory are correspondingly according to different operating modes. It is also possible that the weight of the frequency of the GPU memory, the weight of the number of GPU cores, the weight of the GPU bandwidth, the weight of the operating power of the GPU, the weight of the size of residual GPU memory and the weight of the size of total GPU memory are adjusted correspondingly according to the real status of the current distributed cluster.

(5): The GPU sniffer initializes the transmitted information, and determines whether there is a GPU in the GPU information list cache of the operating node. If there is no GPU in the GPU information list cache of the operating node, information indicating the absence of a GPU is packaged, and the packaged information is transmitted to the data plane for reporting by loading the configuration file content in the GPU information list cache in (1). If there is a GPU in the GPU information list cache of the operating node, the information parameter of the MainGPU and the corresponding value of the information parameter of the MainGPU are added to fields of the transmitted information, the number of GPUs and the size of total GPU memory are calculated, the number of GPUs and the size of total GPU memory are added to fields of the transmitted information. The transmitted information is transmitted to the data plane for reporting by loading the configuration file content in the GPU information list cache in (1), so that the transmitted information is received and checked by a checker and stored into the GPU information list cache.

During next information reporting, each field of the transmitted information in the GPU information list cache is compared with each field of the newly-generated transmitted information. If each field of the transmitted information in the GPU information list cache is identical to each field of the newly-generated transmitted information, information reporting is not performed, or otherwise the transmitted information in the GPU information list cache is covered by using the newly-generated transmitted information, and the configuration file content in the GPU information list cache in (1) is loaded. The newly-generated transmitted information is transmitted to the data plane for reporting so that the newly-generated transmitted information is received and checked by the checker.

Figure 3:
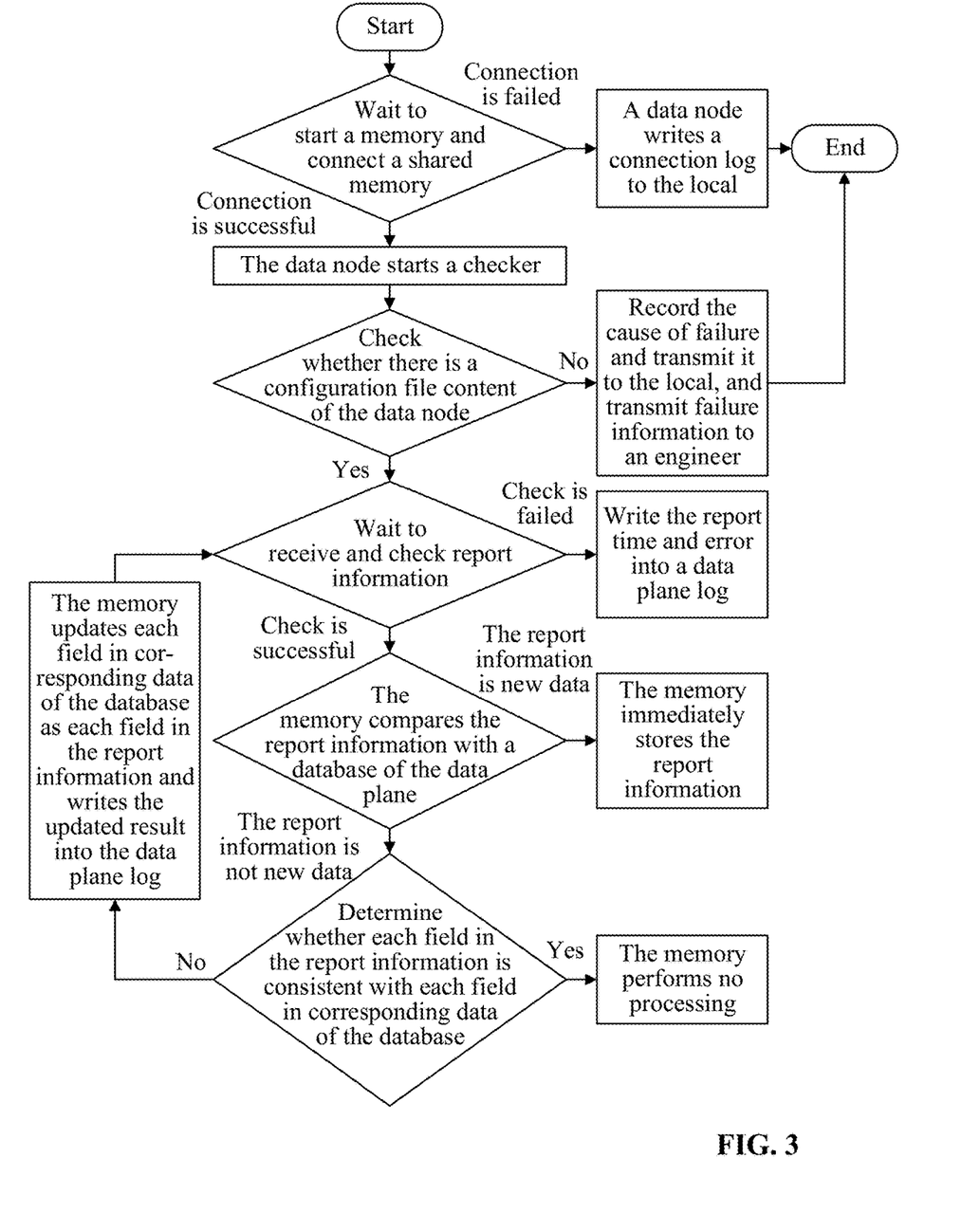
FIG. 3 is a flowchart of the operation of a checker in method for detecting comprehensive GPU-related factors of a distributed cluster according to an embodiment of the disclosure.

As shown in FIG. 3, the disclosure discloses a method for detecting comprehensive GPU-related factors of a distributed cluster, comprising the following steps.

A checker waits to start a memory and connect a shared memory. If the connection is failed, a data node writes a connection log locally for use by an engineer to check errors, and this step ends; and, if the connection is successful, the data node starts the checker.

The checker checks whether there is a configuration file content of the data node. If there is no configuration file content of the data node, the cause of failure is recorded and transmitted to the local, failure information is transmitted to the engineer, and this step ends. The configuration file content of the data node comprises the IP address and port number of the data node.

If there is the configuration file content of the data node, the configuration file content of the data node is read, and the configuration file content is stored into a GPU information list cache of an operating node, so that a Web server is started to block monitoring, and the checker waits to receive and check report information transmitted by a GPU sniffer. The report information comprises information indicating whether the report node is a node in a distributed cluster, information indicating whether it has a permission to report information, information indicating whether the format of the report information is standard, and information indicating whether fields in the report information are legal. The information indicating whether the data node belongs to the distributed cluster and the report information permission are stored into a database of the data plane in advance.

If the check is failed, the report information is discarded, and the report time and error are written into a data plane log. If the check is successful, the report information is transmitted to the memory so that the memory compares the report information with the database of the data plane.

If the result of comparison indicates that the report information is inconsistent with that stored in the data plane, the memory immediately stores the report information, or otherwise it is determined whether each field in the report information is consistent with each field in corresponding data of the database. If each field in the report information is consistent with each field in corresponding data of the database, the memory performs no processing; and, if each field in the report information is not consistent with each field in corresponding data of the database, the memory updates each field in corresponding data of the database as each field in the report information and writes the updated result into the data plane log.

The checker re-waits to receive and check report information transmitted by the GPU sniffer.

The data plane realizes load balancing of traffic of data nodes by the heartbeat detection technology and virtual IP technology in the existing cloud computing technologies, so that efficient availability of the system for detecting comprehensive GPU-related factors of a distributed cluster is ensured, the occurrence of single points of failure is avoided, and the data plane realize the consistency of data in a plurality of data nodes by a shared memory.

In accordance with the embodiments of the disclosure, GPU information is updated by comparing the set GPU information list cache of the operating node with the set fields of the data plane, so that the frequency of information reporting is reduced and the cost for information transmission is lowered. The diversity of GPU resources is highlighted by a multi-mode scoring strategy, so that GPU computing requirements of more complex scenarios are adapted.

An embodiment of the disclosure further provides a system for detecting comprehensive GPU-related factors of a distributed cluster, the system comprising the following modules.

Configuration file content checking module: it is configured to check whether there is a configuration file content of an operating node; if there is the configuration file content of the operating node, read the configuration file content of the operating node, store the configuration file content into a GPU information list cache, determine whether the communication with a data plane is normal, if normal, execute a "mode switching module"; if the communication is failed, record the cause of failure and transmit failure information to an engineer, and communicate with the data plane again by the GPU sniffer until the communication is normal; and, if there is no configuration file content of the operating node, record the cause of failure and transmit it to the local, transmit the failure information to the engineer, and end this step;

Mode switching mode: it is configured to read a mode parameter in an environment variable of the operating node, and correspondingly switch an operating mode according to the mode parameter;

Reading module: it is configured to read a timer frequency value from the environment variable of the operating node so as to set a time period for reading a GPU information parameter according to the timer frequency value, and further configured to read the number of GPUs and a GPU information parameter of the operating node and store the number of GPUs and the GPU information parameter of the operating node into the GPU information list cache. If there is no GPU in the GPU information list cache, the GPU information list cache is emptied. If the health status of a GPU is UNHEALTH, the GPU information parameter is not added to the GPU information list cache. After an "information reporting module" is executed, a timer is reset, a next time period for reading the GPU information parameter is waited, and the "reading module" will be executed again. If the operating node is concurrent asynchronously, a "score calculation module" will be executed.

Score calculation module: it is configured to calculate the maximum value of the GPU information parameter of the operating node, and store the maximum value of the GPU information parameter of the operating node into the GPU information list cache; and, it is further configured to calculate a GPU performance score of the operating node in a different operating mode according to the value of the GPU information parameter and the maximum value of the GPU information parameter, and set a GPU having the highest performance score as MainGPU.

The GPU performance score of the operating node in a different operating mode is calculated by the following formula:

$$Score = \left(\frac{GMemoryClock}{MaxMemClock}\right) \times 100 + MemCWeight +$$
$$\left(\frac{GCores}{MaxCores}\right) \times 100 \times CoreWeight +$$
$$\left(\frac{GBandwidth}{MaxBandwidth}\right) \times 100 \times BandWeight +$$
$$\left(1 - \frac{GPower}{MaxPower}\right) \times 100 \times PowWeight +$$
$$\left(\frac{GMemory}{MaxMemory} + \frac{GFreeMemory}{MaxFreeMem} \times FreeMemWeight\right) \times$$
$$100 \times MemoryWeight$$

where Score is the GPU performance score of the operating node in a different operating mode; MemCWeight is the weight of the frequency of the GPU memory; CoreWeight is the weight of the number of the GPU cores; BandWeight is the weight of the GPU bandwidth; PowWeight is the weight of the operating power of the GPU; FreeMemWeight is the weight of the residual GPU memory; MemoryWeight is the weight of the total GPU memory; GMemoryClock is the size of GPU memory; GCores is the number of GPU cores; GBandwidth is the GPU bandwidth; GPower is the operating power of the GPU; GMemory is the size of total GPU memory; GFreeMemory is the size of residual GPU memory; MaxMemClock is the maximum value of the frequency of GPU memory; MaxCores is the maximum value of the number of GPU cores; MaxBandwidth is the maximum value of the GPU bandwidth; MaxPower is the maximum value of the operating power of the GPU; MaxMemory is the maximum value of the size of total GPU memory and, MaxFreeMem is the maximum value of the size of residual GPU memory.

Information reporting module: it is configured to initialize the transmitted information, determine whether there is a GPU in the GPU information list cache, and report information. Specifically, the information reporting module initializes the transmitted information, and determines whether there is a GPU in the GPU information list cache of the operating node. If there is no GPU in the GPU information list cache of the operating node, information indicating the absence of a GPU is packaged, and the packaged information is transmitted to the data plane for reporting by loading the configuration file content in the GPU information list cache in the "configuration file content checking module". If there is a GPU in the GPU information list cache of the operating node, the information parameter of the MainGPU and the corresponding value of the information parameter of the MainGPU are added to fields of the transmitted information, the number of GPUs and the size of total GPU memory are calculated, the number of GPUs and the size of total GPU memory are added to fields of the transmitted information. The transmitted information is transmitted to the data plane for reporting by loading the configuration file content in the GPU information list cache in the "configuration file content checking module", so that the transmitted information is received and checked by a checker and stored into the GPU information list cache.

During next information reporting, each field of the transmitted information in the GPU information list cache is compared with each field of the newly-generated transmitted information. If each field of the transmitted information in the GPU information list cache is identical to each field of the newly-generated transmitted information, information reporting is not performed, or otherwise the transmitted information in the GPU information list cache is covered by using the newly-generated transmitted information, and the configuration file content in the GPU information list cache in the "configuration file content checking module" is loaded. The newly-generated transmitted information is transmitted to the data plane for reporting so that the newly-generated transmitted information is received and checked by the checker.

The disclosure discloses a system for detecting comprehensive GPU-related factors of a distributed cluster, the system comprising the following modules:

Connection waiting module: it is configured to wait to start a memory and connect a shared memory; if the connection is failed, writing, by a data node, a connection log locally for use by an engineer to check errors, and end this step; and, if the connection is successful, start a checker by the data node.

Configuration file content checking module: it is configured to check whether there is a configuration file content of the data node; if there is no configuration file content of the data node, record the cause of failure and transmit it to the local, transmit failure information to the engineer, and end this step; if there is the configuration file content of the data node, read the configuration file content of the data node and store the configuration file content into a GPU information list cache of an operating node so that a Web server is started to block monitoring, and wait to receive and check report information transmitted by a GPU sniffer; if the check is failed, discard the report information, and write the report time and error into a data plane log; and, if the check is successful, transmit the report information to the memory. The configuration file content of the data node comprises the IP address and port number of the data node. The report information comprises information indicating whether the report node is a node in a distributed cluster, information indicating whether it has a permission to report information, information indicating whether the format of the report information is standard, and information indicating whether fields in the report information are legal. The information indicating whether the data node belongs to the distributed cluster and the report information permission are stored into a database of the data plane in advance.

Data comparison module: it is configured to compare, by the memory, the report information with a database of the data plane; if the result of comparison indicates that the report information is inconsistent with that stored in the data plane, immediately store the report information by the memory, or otherwise determine whether each field in the report information is consistent with each field in corresponding data of the database; if each field in the report information is consistent with each field in corresponding data of the database, performing no processing by the memory; and, if each field in the report information is not consistent with each field in corresponding data of the database, execute an "updating and writing module".

Updating and writing module: it is configured to update, by the memory, each field in corresponding data of the database as each field in the report information and write the updated result into the data plane log.

Reporting re-writing module: it is configured to re-wait to receive and check report information transmitted by the GPU sniffer.

The embodiments in this specification are described progressively. The focus of each embodiment is different from that of other embodiments, and identical or similar parts of the embodiments refer to each other.

It will be obvious to those skilled in the art that changes and modifications may be made, and therefore, the aim in the appended claims is to cover all such changes and modifications.

What is claimed is:

1. A method for detecting comprehensive GPU-related factors of a distributed cluster, the method comprising:
   (1) checking whether there is a configuration file content of an operating node; if there is the configuration file content of the operating node, reading the configuration file content of the operating node, storing the configuration file content into a GPU information list cache, and conducting a communication with a data plane; if there is no configuration file content of the operating node, recording the cause of failure and transmitting the failure information to an engineer;
   (2) determining whether the communication with the data plane is normal, if the communication is normal, reading a mode parameter in an environment variable of the operating node, and correspondingly switching an operating mode according to the mode parameter; if the communication is failed, recording a cause of failure and transmitting failure information to the engineer, and communicating with the data plane again by a GPU sniffer until the communication is normal;
   (3) reading a timer frequency value from the environment variable of the operating node so as to set a time period for reading a GPU information parameter according to the timer frequency value; reading the number of GPUs and a GPU information parameter of the operating node, and storing the number of GPUs and the GPU information parameter of the operating node into the GPU information list cache; if there is no GPU in the GPU information list cache, emptying the GPU information list cache; if a health status of a GPU is UNHEALTH, not adding the GPU information parameter to the GPU information list cache;
   (4) calculating the maximum value of the GPU information parameter of the operating node, and storing the maximum value into the GPU information list cache; and, calculating a GPU performance score of the operating node in a different operating mode according to the value of the GPU information parameter and the maximum value of the GPU information parameter, and setting a GPU having the highest performance score as MainGPU;
   (5) initializing the transmitted information; determining whether there is a GPU in the GPU information list cache of the operating node; if there is no GPU in the GPU information list cache of the operating node, packaging information indicating the absence of a GPU, and transmitting the packaged information to the data plane for reporting by loading the configuration file content; if there is a GPU in the GPU information list cache of the operating node, adding the information parameter of the MainGPU and the corresponding value of the information parameter of the MainGPU to fields of the transmitted information, calculating the number of GPUs and the total size of GPU memory, adding the number of GPUs and the total size of GPU memory to fields of the transmitted information, transmitting the transmitted information to the data plane for reporting so that the transmitted information is received and checked by a checker and stored into the GPU information list cache; and
   during next information reporting, comparing each field of the transmitted information in the GPU information list cache with each field of the newly-generated transmitted information; if each field of the transmitted information in the GPU information list cache is identical to each field of the newly-generated transmitted information, not reporting information, or otherwise covering the transmitted information in the GPU information list cache by using the newly-generated transmitted information, loading the configuration file content, and transmitting the newly-generated transmitted information to the data plane for reporting so that the newly-generated transmitted information is received and checked by the checker; and
   (6) after (5) is completed, resetting a timer, waiting for a next time period for reading the GPU information parameter, and executing (3) again.

2. The method of claim 1, wherein the configuration file content of the operating node comprises an IP address and a port number of the data plane.

3. The method of claim 1, wherein the GPU information parameter comprises an identification number of the GPU, the health status of the GPU, a model of the GPU, an operating power of the GPU, a frequency of a GPU memory, a size of the GPU memory, a size of a residual GPU memory, and a number of GPU cores and a GPU bandwidth.

4. The method of claim 3, wherein in (3), the reading a timer frequency value from the environment variable of the operating node comprises:
   if a read timer frequency value is null, defaulting the time period of the GPU information parameter as 1 s, and reading the GPU information parameter of the operating node every 1 s; if the read timer frequency value is greater than 10, setting the timer frequency value as 10; if the read timer frequency value is less than 0.1, setting the timer frequent value as 0.1; and, if the read timer frequency value is in a valid range, not resetting the timer frequency value, where the valid range of the timer frequency is 0.1 to 10.

5. The method of claim 1, wherein in (4), the GPU performance score of the operating node in a different operating mode is calculated by the following formula:

$$Score = \left(\frac{GMemoryClock}{MaxMemClock}\right) \times 100 + MemCWeight +$$
$$\left(\frac{GCores}{MaxCores}\right) \times 100 \times CoreWeight +$$
$$\left(\frac{GBandwidth}{MaxBandwidth}\right) \times 100 \times BandWeight +$$
$$\left(1 - \frac{GPower}{MaxPower}\right) \times 100 \times PowWeight +$$
$$\left(\frac{GMemory}{MaxMemory} + \frac{GFreeMemory}{MaxFreeMem} \times FreeMemWeight\right) \times$$
$$100 \times MemoryWeight$$

where Score is the GPU performance score of the operating node in a different operating mode; MemCWeight is a weight of the frequency of the GPU memory; CoreWeight is a weight of the number of the GPU cores; BandWeight is a weight of the GPU bandwidth; Pow Weight is a weight of the operating power of the GPU; FreeMemWeight is a weight of the residual GPU memory; MemoryWeight is a weight of the total GPU memory; GMemoryClock is the size of GPU memory; GCores is a number of GPU cores; GBandwidth is the GPU bandwidth; GPower is an operating power of the GPU; GMemory is the size of total GPU memory; GFreeMemory is the size of residual GPU memory; MaxMemClock is a maximum value of the frequency of GPU memory; MaxCores is a maximum value of the number of GPU cores; MaxBandwidth is a maximum value of the GPU bandwidth; MaxPower is a maximum value of the operating power of the GPU; MaxMemory is a maximum value of the size of total GPU memory; and MaxFreeMem is a maximum value of the size of residual GPU memory.

6. A method for detecting comprehensive GPU-related factors of a distributed cluster, the method being applied to a checker and comprising:

conducting a connection to a shared memory when a memory is started; if the connection is failed, writing, by a data node, a connection log locally for use by an engineer to check errors; and, if the connection is successful, starting a checker by the data node;

checking whether there is a configuration file content of the data node; and, if there is no configuration file content of the data node, recording the cause of failure and transmitting the cause of failure to the local, transmitting failure information to the engineer;

if there is the configuration file content of the data node, reading the configuration file content of the data node and storing the configuration file content into a GPU information list cache of an operating node so that a Web server is started to block monitoring, and waiting to receive and check report information transmitted by a GPU sniffer; if the check is failed, discarding the report information, and writing the report time and error into a data plane log; and, if the check is successful, transmitting the report information to the memory so that the memory compares the report information with a database of a data plane;

if the result of comparison indicates that the report information is inconsistent with that stored in the data plane, immediately storing the report information by the memory, or otherwise determining whether each field in the report information is consistent with each field in corresponding data of the database;

if each field in the report information is consistent with each field in corresponding data of the database, performing no processing by the memory; and, if each field in the report information is not consistent with each field in corresponding data of the database, updating, by the memory, each field in corresponding data of the database as each field in the report information, and writing the updated result into the data plane log; and receiving and checking report information transmitted by the GPU sniffer.

7. The method of claim 6, wherein the configuration file content of the data node comprises the IP address and port number of the data node; and the report information comprises information indicating whether the report node is a node in a distributed cluster, information indicating whether the report node has a permission to report information, information indicating whether the format of the report information is standard, and information indicating whether fields in the report information are legal.

8. The method of claim 6, wherein the operating node comprises the GPU sniffer, the data plane comprises no less than three data nodes, and the data node comprises a memory and a checker.

9. A system for detecting comprehensive GPU-related factors of a distributed cluster, the system comprising:

a configuration file content checking module configured to: check whether there is a configuration file content of an operating node; if there is the configuration file content of the operating node, read the configuration file content of the operating node, store the configuration file content into a GPU information list cache, determine whether the communication with a data plane is normal, if normal, execute a mode switching module; if the communication is failed, record the cause of failure and transmit failure information to an engineer, and communicate with the data plane again by the GPU sniffer until the communication is normal; and, if there is no configuration file content of the operating node, record the cause of failure and transmit it to the local, transmit the failure information to the engineer;

the mode switching module configured to: read a mode parameter in an environment variable of the operating node, and correspondingly switch an operating mode according to the mode parameter;

a reading module configured to: read a timer frequency value from the environment variable of the operating node so as to set a time period for reading a GPU information parameter according to the timer frequency value; and, read the number of GPUs and a GPU information parameter of the operating node, and store the number of GPUs and the GPU information parameter of the operating node into the GPU information list cache;

a score calculation module configured to: calculate the maximum value of the GPU information parameter of the operating node, and store the maximum value of the GPU information parameter of the operating node into the GPU information list cache; and, calculate a GPU performance score of the operating node in a different operating mode according to the value of the GPU information parameter and the maximum value of the GPU information parameter, and set a GPU having the highest performance score as MainGPU; and an information reporting module configured to: initialize the transmitted information, determine whether there is a GPU in the GPU information list cache, and report information.

10. A system for detecting comprehensive GPU-related factors of a distributed cluster, the system comprising:

a connection module configured to: conduct a connection to a shared memory when a memory is started; if the connection is failed, writing, by a data node, a connection log locally for use by an engineer to check errors; and, if the connection is successful, start a checker by the data node;

a configuration file content checking module configured to: check whether there is a configuration file content of the data node; if there is no configuration file content of the data node, record the cause of failure and transmit the cause of failure to the local, transmit failure information to the engineer; if there is the configuration file content of the data node, read the configuration file content of the data node and store the configuration file content into a GPU information list cache of an operating node so that a Web server is started to block monitoring, and receive and check report information transmitted by a GPU sniffer; if the check is failed, discard the report information, and write the report time and error into a data plane log; and, if the check is successful, transmit the report information to the memory;

a data comparison module configured to: compare, by the memory, the report information with a database of the data plane; if the result of comparison indicates that the report information is new data, immediately store the report information by the memory, or otherwise determine whether each field in the report information is consistent with each field in corresponding data of the database; if each field in the report information is consistent with each field in corresponding data of the database, performing no processing by the memory; and, if each field in the report information is not consistent with each field in corresponding data of the database, execute an updating and writing module;

the updating and writing module configured to: update, by the memory, each field in corresponding data of the database as each field in the report information, and write the updated result into the data plane log; and a reporting module configured to: receive and check report information transmitted by the GPU sniffer.

\* \* \* \* \*